Feb. 16, 1960  G. E. CULLEN  2,924,886
TRANSMITTING MAGNETIC COMPASS SYSTEMS
Filed July 30, 1957
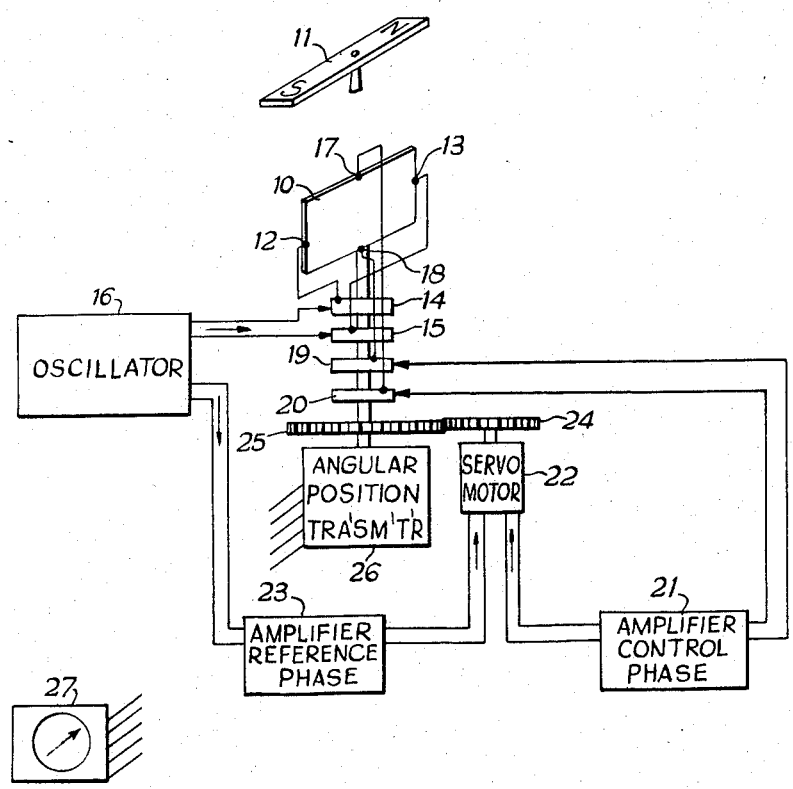
G. E. CULLEN
INVENTOR
ATTORNEYS

United States Patent Office 2,924,886
Patented Feb. 16, 1960

2,924,886

TRANSMITTING MAGNETIC COMPASS SYSTEMS

Graëme E. Cullen, Hillington, Glasgow, Scotland, assignor to Kelvin & Hughes Limited Application July 30, 1957, Serial No. 675,192

Claims priority, application Great Britain August 8, 1956

5 Claims. (Cl. 33—222)

The present invention relates to transmitting magnetic compass systems and constitutes an improvement in or modification of the invention claimed in co-pending application Ser. No. 530,740.

A transmitting magnetic compass system may comprise a magnetic compass, a ring of magnetic material located in the field of the compass magnet and rotatable relatively to the compass housing about an axis fixed in relation to the compass pivot and passing substantially through the compass pivot, means including windings upon said ring, for generating a voltage dependent upon changes in the angular position of the ring about its axis relatively to the said field, means for applying the said voltage to drive the ring in such a manner that its angular position in relation to the field tends to remain substantially constant, and means adapted to transmit the movements of the ring relatively to the compass housing to one or more remote points.

This arrangement has the advantage that owing to the symmetry of the ring of magnetic material, the magnetism induced therein by the compass needle when the windings are not energised has a negligible effect upon the compass magnet. It is thus possible to obtain accurate indications from the magnetic compass not only when in use as a transmitting compass but also when it is not being used as a transmitting compass and when, therefore, the ring is not maintained in constant angular relation to the field of the compass magnet.

It has now been found that an effective equivalent for the ring of magnetic material and its associated windings, with the same advantages, is a semi-conductor crystal which exhibits the Hall effect. Thus if such a crystal is situated in a magnetic field and if a current is passed through it in one direction, at right angles to the magnetic field, a potential difference is generated across the crystal in a direction at right angles to the first-named direction and to the magnetic field.

Accordingly there is provided a transmitting magnetic compass system comprising a magnetic compass, a semi-conductor body which exhibits the Hall effect located in the field of the compass magnet and rotatable relatively to the compass housing about an axis fixed in relation to the compass pivot, means for passing a current through the body in a first direction, means for deriving from the body a voltage which is generated therein in a direction transverse with respect to the first direction, means for applying the said voltage to drive the body in such a manner that the said voltage tends to zero and the angular position of the body in relation to the field tends to remain substantially constant, and means adapted to transmit the movements of the body relatively to the compass housing to one or more remote points.

The present construction offers a very substantial advantage over bar-type constructions in that it avoids needle deflecting induced magnetism in the pick-off element of the compass follow-up. The ring construction and the doughnut-shaped field induced therein by the compass magnet produce no error reaction on the compass needle because the magnetic field is symmetrical with respect to the compass needle and do not react thereon when a change of bearing occurs during the time when the remote transmitting gear is disconnected.

The invention will be described, by way of example, with reference to the accompanying drawing which is a diagrammatic representation of one embodiment.

In the drawing a crystal 10 which exhibits the Hall effect, for instance a crystal of indium antimonide, is rotatably mounted in the field of a compass magnet 11, the axis of rotation of the crystal 10 being coincident with the axis of rotation of the compass magnet 11. Two opposite points 12 and 13 on the crystal 10 are connected through slip rings 14, 15 and co-operating brushes to output terminals of an oscillator 16 generating an oscillatory current at a suitable frequency, for example an oscillatory current is thereby passed through the crystal 10 in a horizontal direction and when the magnetic field of the magnet 11 has a component perpendicular to the direction of this current a potential difference is generated in a vertical direction at right angles to the said component of the magnetic field, that is between points 17 and 18. These points are connected through slip rings 19 and 20 and co-operating brushes to the input of a control phase amplifier 21, the output of which is connected to one input to a servo motor 22. A reference oscillation from the oscillator 16 is amplified in a reference amplifier 23 and applied to another input to the servo motor 22. The arrangement is such that there is a leading or lagging phase difference between the reference and the control oscillations applied to the servo motor 22 according to which the latter rotates in such a direction as to reduce the control signal to zero. The servo motor 22 rotates, through suitable gearing 24, 25, the crystal 10 and its associated slip rings 14, 15, 19, 20 and also an angular position transmitter 26 by means of which corresponding movements are transmitted to and reproduced by an angular position receiver 27 which may be located in a position remote from the compass.

The crystal 10 thus tends to maintain a position in which the plane containing the points 12, 13, 17 and 18 is parallel to the magnetic field of the magnet 11. The current between the points 12 and 13 then has a negligible effect upon the position of the magnet 11.

With this arrangement it is not necessary that the motor 22 should be located remote from the compass binnacle and connected thereto by a flexible drive as in the arrangement described in application Ser. No. 530,740. The motor 22 may be a miniature electric motor located immediately beneath the compass bowl.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. A transmitting magnetic compass system comprising a magnetic compass including a compass magnet mounted for rotation about an axis, a semi-conductor body exhibiting the Hall effect located in the field of said magnet and mounted for rotation about an axis fixed in relation to the magnet axis, means for passing an electric current through said body in a first direction, terminal means for deriving a voltage from said body in a second direction transverse with respect to the first direction, driving means for rotating said body about its axis, and means coupling said terminal means to said driving means.

2. A system according to claim 1, wherein said means for passing a current through the body comprise an oscillator and wherein said driving means comprise a motor responsive to a difference in phase, said system including means coupling said oscillator to said motor to provide a reference phase.

3. A transmitting magnetic compass system comprising a magnetic compass including a compass magnet mounted for rotation about an axis, a semi-conductor body exhibiting the Hall effect located in the field of said magnet and mounted for rotation about an axis fixed in relation to the magnet axis, means for passing an electric current through said body in a first direction, terminal means for deriving a voltage from said body in a second direction transverse with respect to the first direction, driving means for rotating said body about its axis, means coupling said terminal means to said driving means, a remote indicating means, and means coupling said body to said remote indicating means to cause the remote indicating means to follow the movements of said body.

4. The combination set forth in claim 1, in which said semi-conductor body comprises a crystal so mounted that it aligns at least one axis thereof substantially parallel to the magnetic field of said magnet whereby any current passing through said crystal along said axis has a negligible effect upon the position of said magnet.

5. The combination set forth in claim 4, in which said crystal is of indium antimonide.

References Cited in the file of this patent

UNITED STATES PATENTS

| | | |
|---|---|---|
| 2,308,566 | Noxon | Jan. 19, 1943 |
| 2,707,769 | Shaper | May 3, 1955 |
| 2,814,015 | Kuhrt | Nov. 19, 1957 |